A. E. CHASE & C. A. BRINEY.
CAMERA.
APPLICATION FILED NOV. 8, 1912.
1,137,185.
Patented Apr. 27, 1915.
5 SHEETS—SHEET 1.
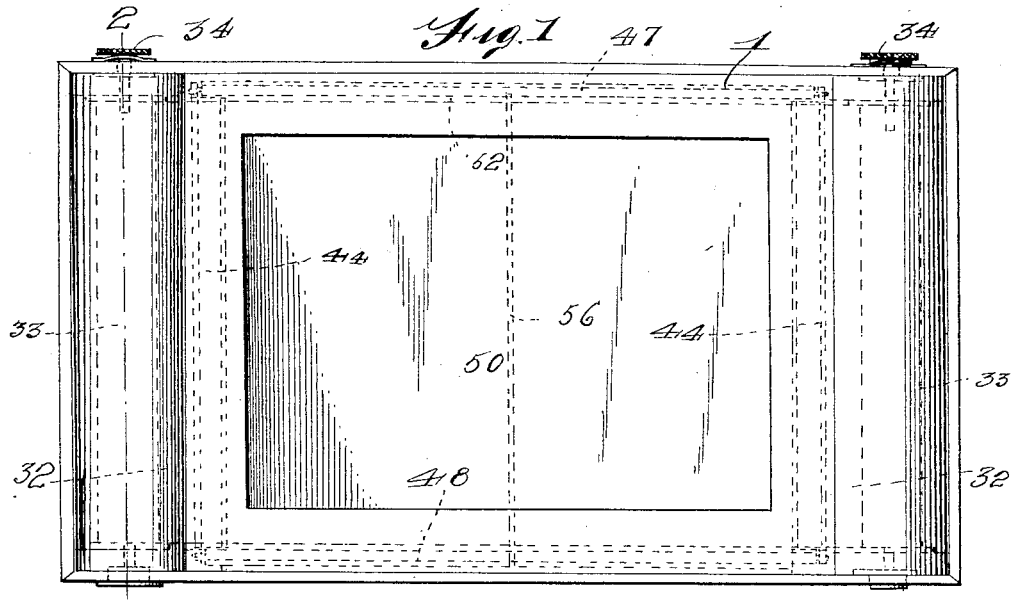
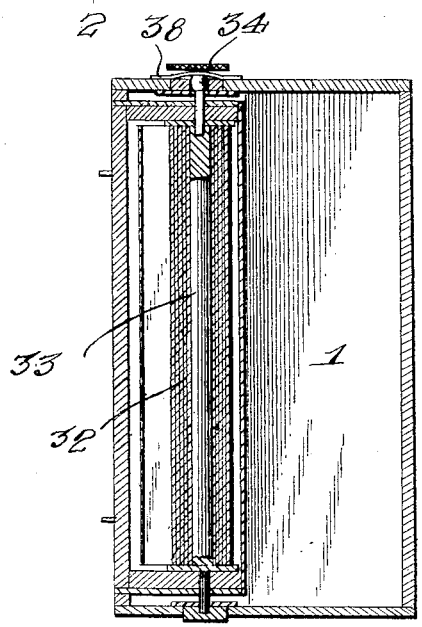
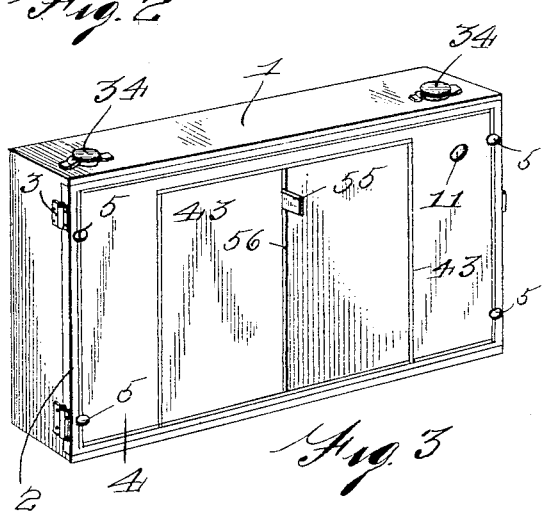

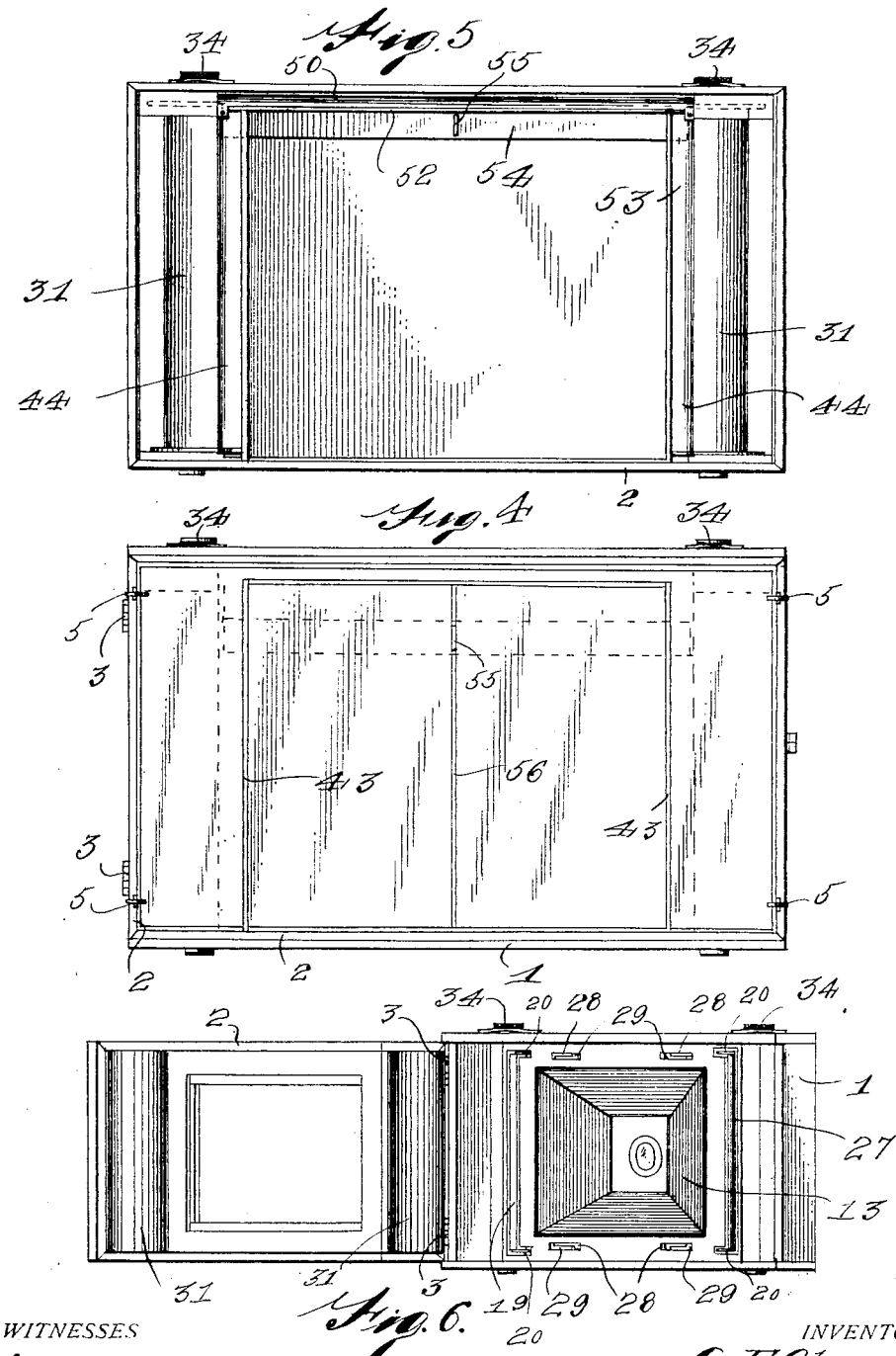

A. E. CHASE & C. A. BRINEY.
CAMERA.
APPLICATION FILED NOV. 8, 1912.
1,137,185.
Patented Apr. 27, 1915.
5 SHEETS—SHEET 3.
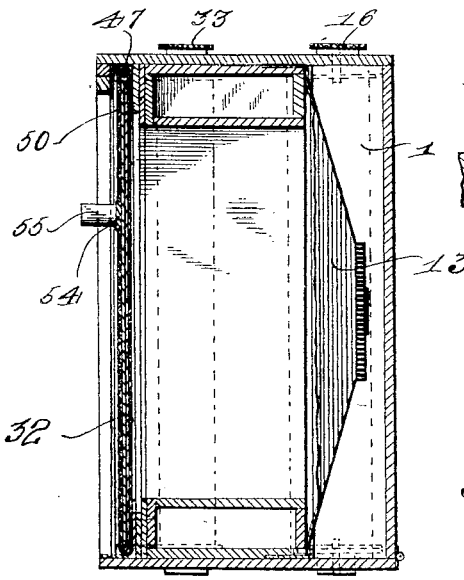
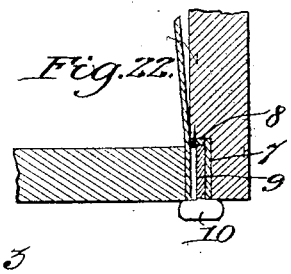
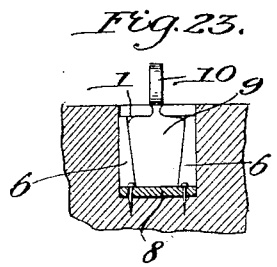
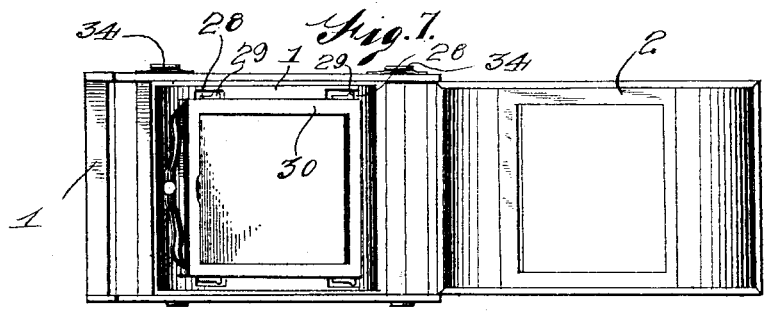
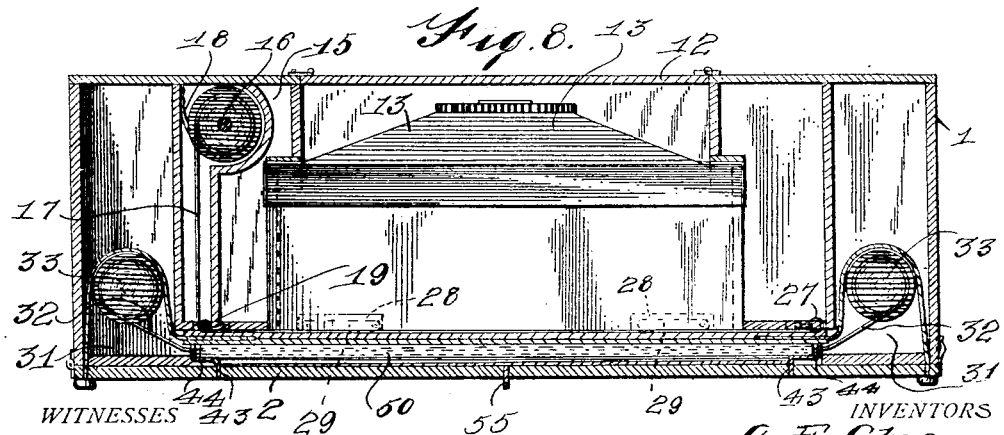

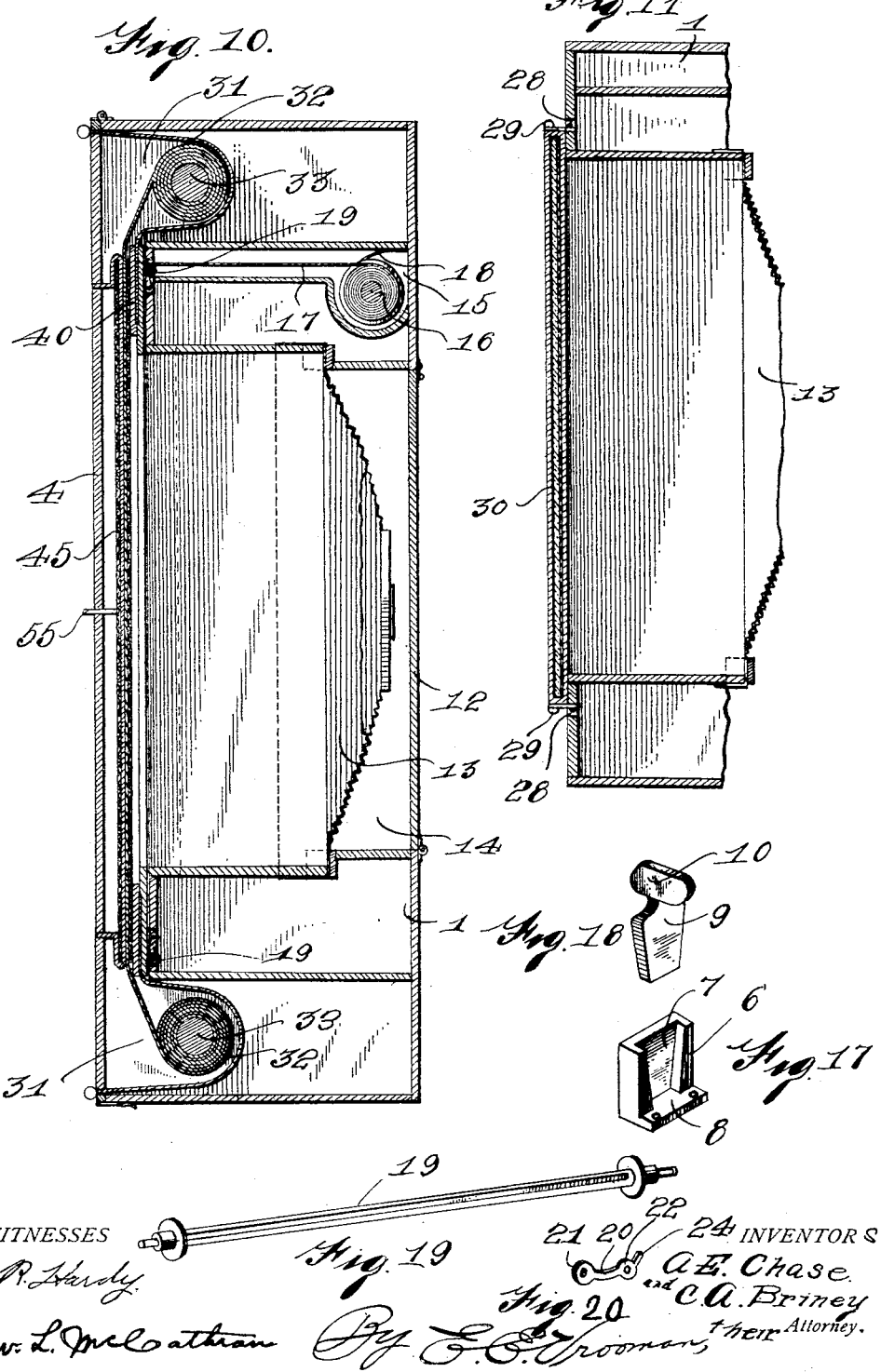

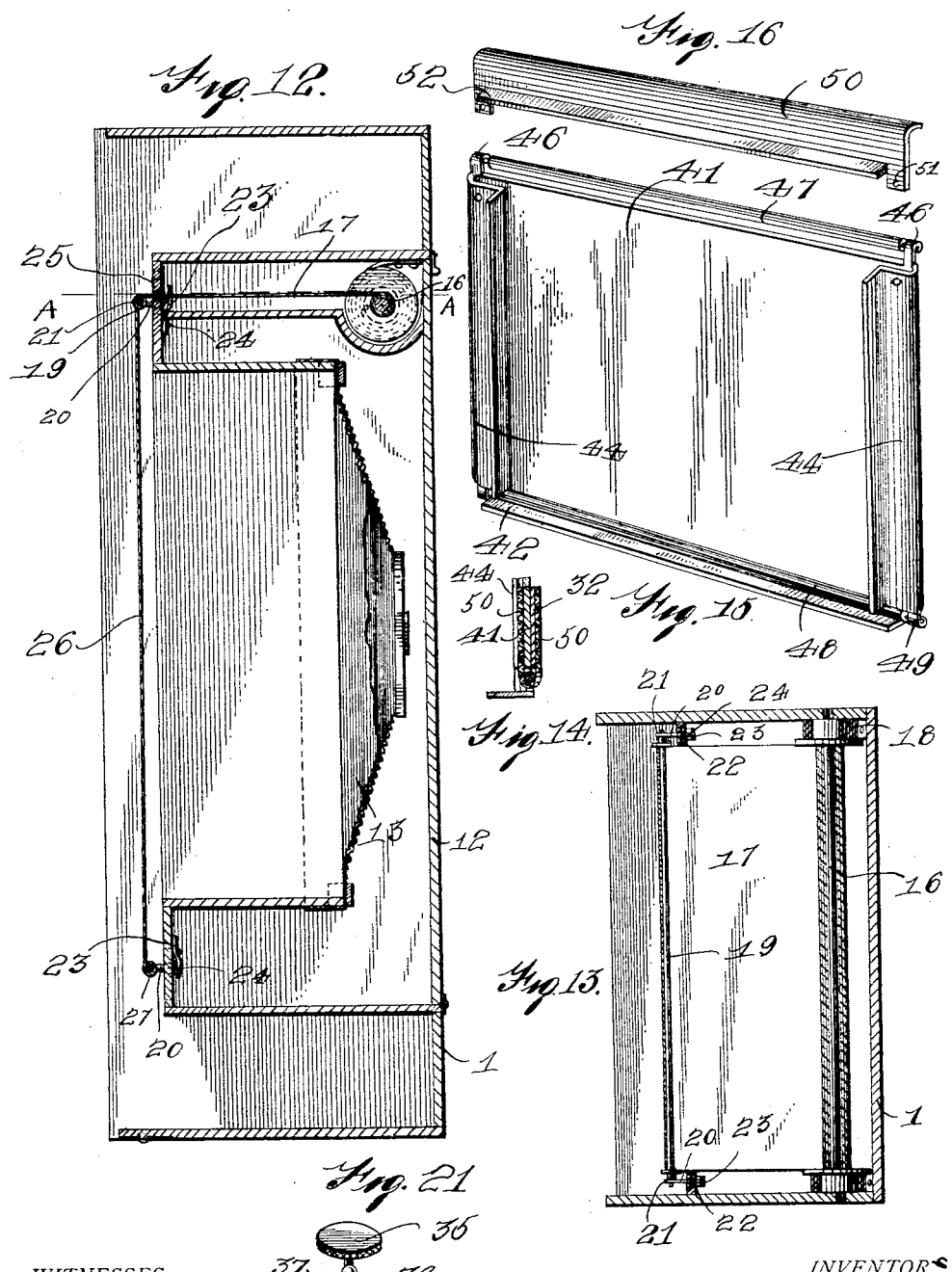

UNITED STATES PATENT OFFICE.

ALBERT E. CHASE AND CARL A. BRINEY, OF NEW SHARON, IOWA, ASSIGNORS OF ONE-THIRD TO JAMES E. DE WITT, OF NEW SHARON, IOWA.

CAMERA.

1,137,185.      Specification of Letters Patent.      Patented Apr. 27, 1915.

Application filed November 8, 1912. Serial No. 730,255.

*To all whom it may concern:*

Be it known that we, ALBERT E. CHASE and CARL A. BRINEY, citizens of the United States, residing at New Sharon, in the county of Mahaska and State of Iowa, have invented certain new and useful Improvements in Cameras, of which the following is a specification, reference being had therein to the accompanying drawing.

This invention relates to cameras and has for its object the production of an efficient camera whereby films may be used in place of the ordinary plates now commonly used in cameras where it is necessary to focus the camera through a focusing screen by viewing the object through the lens.

Another object of this invention is the production of an efficient mechanism for shielding the film while the film carrying frame is swung away from the body of the camera so as to prevent light from affecting the chemicals upon the film.

With these and other objects in view, this invention consists of certain novel details of construction, combinations and arrangements of parts, as will be hereinafter fully described and claimed.

In the drawings:—Figure 1 is a front view of the camera. Fig. 2 is a section taken on line 2—2 of Fig. 1. Fig. 3 is a detail perspective of the camera. Fig. 4 is a rear view of the camera. Fig. 5 is a rear view of the camera showing the rear removable plate removed from the body. Fig. 6 is a perspective view of the camera showing the hinged back swung from the front of the camera. Fig. 7 is a detail perspective similar to Fig. 6 showing a plate positioned in the body of the camera in place of the film. Fig. 8 is a central longitudinal section through the camera. Fig. 9 is a central transverse sectional view through the camera. Fig. 10 is a central longitudinal sectional view through the camera showing the portion of the telescoping, focusing body partly in section. Fig. 11 is a central transverse section through the body of the camera showing the manner of holding the plate and plate holder in engagement therewith. Fig. 12 is an enlarged longitudinal section through the body of the camera showing the focusing screen in operation. Fig. 13 is a section taken on line A—A of Fig. 12. Fig. 14 is a detail sectional view showing the manner in which the film protecting curtain passes over one of the guiding rollers. Fig. 15 is a detail perspective of one portion of the guiding frame to which the protector curtain for the film passes. Fig. 16 is a detail perspective of the upper end of the shield casing for the film protector curtain. Fig. 17 is a perspective view of the socket portion of the lock adapted to hold the removable back in engagement with the hinged back of the camera. Fig. 18 is a detail perspective of the locking key adapted to coöperate with the socket as illustrated in Fig. 17. Fig. 19 is a detail perspective of the roller upon which the focusing screen winds and unwinds. Fig. 20 is a detail perspective of one of the brackets supporting the guiding roller for the focusing screen. Fig. 21 is a detail perspective of one of the keys employed in connection with winding the film. Fig. 22 is a transverse section through the case of the camera showing the locking key in cross-section. Fig. 23 is a longitudinal section through one of the sides of the camera showing the locking key in elevation.

By referring to the drawings by numerals it will be seen that 1 designates the body of the camera which may be provided with either squared, rounded, or any other designed ends and still be within the scope of the invention defined in the appended claims. The body 1 is provided with a hinged back 2 which back is hinged to the body by means of the hinges 3. This back 2 is also provided with a removable cover 4 which cover is normally held in engagement with the hinged back 2 by means of the locking keys or clasps 5. These keys 5 comprise a socket portion 6 which is provided with a dove-tail notch 7 and has its laterally extending foot 8 secured to the body of the hinged cover 2. The key portion 9 of the key 5 fits in the dove-tail notch 7 of the socket and the overhanging head 10 holds the removable cover or lid 4 in engagement with the hinged back. A plurality of these keys or locking devices 5 are employed as illustrated in Fig. 2. A view opening 11 is formed in the removable cover 4 so as to allow the film to be viewed therethrough to determine the position of the film after having taken one picture.

The body 1 of the camera is provided with a hinged front plate 12 which is normally closed to protect the telescoping focusing member 13 which member 13 fits in the pocket 14 of the body 1. The body 1 carries a pocket portion 15 in which is supported a roller 16 carrying a focusing curtain 17 which curtain 17 is so prepared as to constitute a translucent curtain to take the place of the ordinary ground glass plate employed in connection with plate cameras. A coil spring 18 is employed in connection with the roller 16 so as to normally hold the curtain 17 in a retracted position. A guiding roller 19 is supported upon the body 1 and extends transversely thereof having its ends carried by the pivotally mounted brackets 20. These brackets are provided with apertures 21 at their outer ends for supporting the stub shafts of the roller 19 and are pivotally secured to the body 1 by means of a pin passing through the aperture 22. Flat springs 23 are carried by the body 1 and engage the rearwardly extending fingers 24 of the brackets 20 so as to normally hold the brackets in a set position after being once swung. The guiding roller 19 is adapted to lie snugly against the body and fit within the slot 25 when the curtain is in a retracted position. While the curtain is drawn to its extended position as indicated at 26 in Fig. 12, the roller 19 will be swung to the position as illustrated in Fig. 12 and the lower end of the curtain may be secured to the opposite roller 27 as illustrated in Fig. 12. These springs 23 normally hold the rollers in their extended position after once being swung, as above described. When, however, the focusing screen or curtain 26 is allowed to rewind upon the roller 16, the rollers 19 and 27 may be forced back in engagement with the body 1 and allow the rollers to be held out of the way while the hinged cover is being swung upon the body. The position of these rollers 19 while not in use is illustrated in Fig. 10.

As illustrated in Figs. 7 and 11, the body 1 may be provided with a plurality of slots 28 in which slots are pivotally mounted the latches 29 which latches are adapted to be swung outwardly to support the focusing plate holder 30. These latches 29 are only adapted to be used in case it is desired to use a plate instead of the film, and these latches 29 normally lie within the slots or notches 28 formed in the back plate or body.

As stated above, a hinged back 2 is secured to the body 1 and this hinged cover or back supports a film carrying frame 31 which film carrying frame comprises a film roll supporting pocket 32 at each end in which the respective film rolls 33 are placed. These film rolls are operated by the keys 34 which keys engage the pintles of the rollers in the usual fashion. These keys are provided with milled heads 35 having shafts 36 upon which the friction balls 37 are placed. Flat springs 38 are adapted to engage these balls 37 for holding the keys in position. Wings 39 are formed upon the lower end of the keys 34 to engage the pintle and cause the same to rotate when the keys are rotated. The film supporting end pockets or casings 32 have their edges secured to the plates 40 as illustrated in Fig. 10.

A light excluding partition 41 is secured to the rear face of the removable plate 4 by having its flanged edges 42 fitting in the grooves 43 formed in the rear face of the plate or cover 4. The edges of this partition 24 are bent to constitute rolled portions 44 which rolled portions act as guides for the film protector curtain 45. Ears 46 are formed upon the upper end of the partition 41 and a guiding roller 47 is supported by these ears to constitute a guide for the curtain 45. A similar roller 48 is carried by the rear end of the partition 41 by having its ends supported by the ears 49 formed upon the partition 41. This roller also constitutes a guide for the shield curtain 45. A protector hood 50 is placed over the upper end of the partition 41 and overhangs the roller 47 by having its independent ends 51 secured to the rolled portions 44 of the partition. This hood 50 is also provided with a flange 52 for fitting in the notches 43 formed in the removable cover 4. The film shield curtain 45 constitutes a substantially endless sheet. This sheet has its respective ends connected by means of chains or cables 53 and the edge of this curtain is provided with a metallic reinforcing plate 54 which plate is provided with a projecting lug 55 extending through the transversely extending slot 56 formed upon the plate 4. It will, therefore, be seen that as the lug 55 is shifted back and forth within the slot 56 the body of the curtain will be brought in front of the exposed portion of the film thereby shielding the same. The body of the shield curtain is, of course, made of such material as to prevent the passage of light therethrough in order to prevent the chemicals of the film from being acted upon by the light. The curtain is so arranged as to cause the body portion of the curtain to be over the sensitized portion of the film when the lug is at one end of the slot, and to cause the chains or cables to pass along the inner guide for film protector curtain when the lug is at the other end of the slot so as to allow the light to act upon the sensitized portion of the film when the camera is in use. Of course, it should be understood that the body portion of the curtain is drawn over the sensitized portion of the film when the rear portion of the camera is swung outwardly so as to focus the camera or obtain access to the interior of the body 1.

From the foregoing description it will be seen that a very efficient and durable device has been produced which will shield the sensitized portion of the film when the rear portion of the camera is swung outwardly in order to allow the camera to be focused through the focusing screen above referred to. Of course, it should be understood that when it is so desired the ordinary finder may be used in connection with the camera.

Having thus described the invention, what is claimed as new, is:—

1. A camera of the class described comprising a body, a hinged back secured thereto, film carrying means carried by said back, and a curtain passing transversely of said film and comprising a body having its ends connected by means of cables, said curtain provided with means for facilitating the drawing of said body in front of the sensitized portion of said film for removing the body of said curtain from in front of the sensitized portion of said film.

2. A camera of the class described comprising a body, a hinged back therefor, a partition secured to said hinged back, guiding rollers carried by said partition, and a shield curtain supported upon said rollers and adapted to travel thereon, cables connecting the free ends of said curtain, and means engaging said curtain for moving said curtain upon said rollers.

3. A camera of the class described comprising a body, a hinged back therefor, a partition carried by said hinged back, said partition provided with rolled ends, rollers carried by the upper and lower edges of said partition, a shield plate positioned upon the upper end of said partition and overhanging the upper end of said rollers, a shield curtain passing over said rollers and having its ends passing in said rolled portions of said partition, and a guiding lug secured to the edge of said curtain for causing said curtain to be drawn over the sensitized portion of said film.

4. A camera of the class described comprising a body, a hinged back therefor, a partition carried by said hinged back, said partition provided with rolled ends, rollers carried by the upper and lower edges of said partition, a shield plate positioned upon the upper end of said partition and overhanging the upper end of said rollers, a shield curtain passing over said rollers and having its ends passing in said rolled portions of said partition, said partition provided with a plurality of laterally extending flanges, said hinged back provided with a plurality of grooves formed therein and adapted to receive said flanges for holding said partition in engagement with said back.

5. A camera of the class described comprising a body, a hinged back therefor, a removable plate secured to said hinged back for facilitating the renewal of the films in said hinged back, sockets carried by said hinged plate provided with dove-tail notches, and locking keys fitting in said dove-tail notches and provided with overhanging heads for engaging said removable cover for holding said removable cover in a locked position relative to said hinged back.

In testimony whereof we hereunto affix our signatures in presence of two witnesses.

ALBERT E. CHASE.
CARL A. BRINEY.

Witnesses:
JAMES E. DE WIT,
CHAS. F. DENSMORE.

Copies of this patent may be obtained for five cents each, by addressing the "Commissioner of Patents, Washington, D. C."